United States Patent [19]

Wyndham

[11] Patent Number: 4,514,373
[45] Date of Patent: Apr. 30, 1985

[54] PURIFICATION OF ALUMINUM CHLORIDE

[75] Inventor: Ronald Wyndham, Thibodaux, La.

[73] Assignee: Toth Aluminum Corporation, Metairie, La.

[21] Appl. No.: 558,539

[22] Filed: Dec. 6, 1983

[51] Int. Cl.³ .................................................. C01F 7/62
[52] U.S. Cl. .................................... 423/495; 423/496; 423/135
[58] Field of Search ............... 423/495, 496, 135, 136, 423/137

[56] References Cited

U.S. PATENT DOCUMENTS

| | | | |
|---|---|---|---|
| 1,645,143 | 10/1927 | Humphrey et al. | 423/135 |
| 3,938,969 | 2/1976 | Sebenik et al. | 423/495 X |
| 4,082,833 | 4/1978 | Wyndham et al. | 423/496 X |
| 4,139,602 | 2/1979 | Wyndham et al. | 423/496 |
| 4,252,774 | 2/1981 | Loutfy et al. | 423/495 X |

FOREIGN PATENT DOCUMENTS

| | | | |
|---|---|---|---|
| 515992 | 8/1955 | Canada | 423/495 |
| 342208 | 1/1931 | United Kingdom | 423/495 |
| 1185234 | 3/1970 | United Kingdom | 423/495 |

OTHER PUBLICATIONS

"Preparation of Anhydrous Aluminum Chloride" by R. L. de Beauchamp Bureau of Mines Information Circular 8412, pp. 11-13, (1980).

Primary Examiner—William R. Dixon, Jr.
Assistant Examiner—Steven Capella
Attorney, Agent, or Firm—Bode & Smith

[57] ABSTRACT

The purification of aluminum chloride, with the crude aluminum chloride normally being obtained through a process of carbo-chlorination of metallic ores, in particularly aluminum bearing ores, to make the metallic chlorides, in particular aluminum chloride. In the present invention, if the crude aluminum chloride does not contain traces of sulfur, the crude aluminum chloride is blended with elemental sulfur or an equivalent sulfur containing compound and simultaneously elemental aluminum powder or an equivalent aluminum containing compound in the solid state is added to the crude aluminum chloride. This blend is kept at 180° C. at one atmosphere of pressure and is fed into a screw-type sublimer wherein the substantially pure aluminum chloride undergoes sublimation in the presence of elemental nitrogen as a purging agent and under constant agitation. The sublimed aluminum chloride is streamed into a reaction ground bed containing aluminum granules at approximately 250° C. for removal of the traces of elemental sulfur therefrom. The then pure aluminum chloride, in the vapor state, is condensed for subsequent collection. If necessary, the aluminum chloride may be further purified through a rectification column and subsequent collection thereafter.

17 Claims, 1 Drawing Figure

PURIFICATION OF ALUMINUM CHLORIDE

BACKGROUND OF THE INVENTION

1. Field of the Invention

The present invention relates to the process for purification of crude metal chlorides, particularly aluminum chloride. More particularly, the subject of the present invention provides for a process for improving rates and yield in the purification of aluminum chloride through the additional elemental sulfur or equivalent sulfur containing compounds and powdered aluminum or equivalent aluminum containing compounds during the purification of the aluminum chloride under agitation and the subsequent removal of trace sulfur through granular aluminum reaction prior to the collection of the pure solid aluminum chloride.

2. General Background

The aluminum industry is illustrative of a situation wherein high grade bauxite or other aluminum containing ores represent limited reserves. However, kaolinitic clay provided a virtually inexhaustible reserve for the aluminum industry. Ore chlorination processes offer what is the most promising economic means for removal and recovery of the valuable aluminum chlorides; however, for example, major obstacles have been the low rates of chlorination, the low yield of aluminum chloride, and the difficulty of obtaining aluminum chloride in sufficient purity for use in various applications.

The overall process of the present invention relates to the purification of aluminum chloride which result primarily from the carbo-chlorination of aluminum containing ores to make the crude aluminum chloride itself. The chlorination of metallic ores in the presence of the sulfur and/or one or more functionally equivalent sulfur containing compounds is known in the art, however, the purification of the resulting crude aluminum chloride through the addition of sulfur and/or equivalent sulfur containing compounds for high yield of pure aluminum chloride and aluminum powder and/or aluminum containing compounds for high quality pure aluminum chloride and the subsequent sublimation of the pure aluminum chloride, lends itself to an entire novel process not found in the art.

Processes for the conversion of the various ores into metallic halides and the subsequent purification of the resulting metallic halide (particularly aluminum chloride) are fairly well known in the art. Also, the utilization of sulfur and/or sulfur containing compounds as reducing agents during the carbo chlorination phase of the production of aluminum chloride has been documented in the literature. For example, U.S. Pat. Nos. 1,858,272; 1,422,568; and 1,405,115 all disclose processes for chlorinating clay and alumina utilizing mixtures or chlorine and sulfur or sulfur chlorides. Also, U.S. Pat. Nos. 1,581,272 and 1,325,203 describe the chlorination of aluminum metals using chlorine and other compounds. U.S. Pat. No. 4,082,833 also teaches the process of clay chlorination, yet stopping far short of the subsequent process for purification of the aluminum chloride resulting therefrom.

In that regard, U.S. Pat. No. 3,938,969 and U.S. Pat. No. 4,035,169 both assigned to Toth Aluminum Corporation teach a method for the recovery of aluminum chloride and the subsequent purification thereof.

U.S. Pat. No. 1,645,143 and Russian Pat. No. 684,000 employ the use of aluminum metal being injected into an aluminum chloride melt, U.S. Pat. No. 1,645,143 in particular illustrating the resulting displacement of the iron from the metal chloride and the subsequent sublimation of the pure aluminum chloride therefrom. However, particularly in U.S. Pat. No. 1,645,143 patent, the aluminum chloride which will result from the sublimation, which is a very slow process, is indeed not as pure as the patent would indicate, and thus still resulting in substantial impure and low yield aluminum chloride. Therefore, there is a significant need in the art for a process which would both yield a high grade aluminum chloride with less than 0.05% iron chloride and a high yield aluminum chloride from the crude aluminum chloride being processed. Such is the case of the present invention.

GENERAL DISCUSSION OF THE PRESENT INVENTION

1. Experimental Data

Although laboratory rectification of crude $AlCl_3$ has demonstrated that product purity can be obtained, unfortunately the high costs of materials of construction for a commercial scale $AlCl_3$ rectification process dictated that alternative methods for purification be investigated.

A proposed alternate process whereby pure $AlCl_3$ can be recovered from crude $AlCl_3$ is selective sublimation at ambient pressure. A series of laboratory tests carried out by Toth Aluminum Corporation have shown that effective separation can be achieved in a three-stage sublimation system. Unfortunately a 3-stage system would result in higher capital costs than for rectification; therefore, it is necessary to demonstrate that product purity can be obtained in a less expensive operation.

Theoretical vapor pressure calculations show that at 170° C. a crude $AlCl_3$ solid containing 5% $FeCl_3$ should sublime to a vapor containing less than 0.05% $FeCl_3$. According to the literature, however, many investigators have demonstrated that an $FeCl_3(AlCl_3)_n$ complex having the same vapor pressure as $AlCl_3$ exists in the vapor state which complicates $FeCl_3$ equilibrium calculations. Difficulties in subliming the $AlCl_3$ were also encountered. However the literature is full of work whereby pure $AlCl_3$ was obtained by subliming $AlCl_3$ from the $FeCl_3$ in the presence of aluminum metal.

The results of the experiments show that a pure $AlCl_3$ product can be obtained by a single-stage sublimation process using Al powder in the presence of sulfur, and that this method is a feasible alternative to the present rectification process.

Starting with a high $FeCl_3$ content in the lab product excellent purity (99.9%+)for the final condensed $AlCl_3$ product is obtained with the use of aluminum metal powder. Although at this point the amount of Al metal required is higher than stoichiometric, further optimization tests may indicate lower Al requirements.

To improve diffusion rate all indications are that the $AlCl_3$ bed will have to be agitated for any commercial operation.

Addressing now the yield rates in the laboratory experiments, it was found that although the purity factor of the aluminum chloride obtained through sublimation was very high, (less 0.05% impure), there was serious problems with the overall yield of the pure aluminum chloride. Theoretically, for every mole per unit time of crude aluminum chloride that was undergoing sublimation, we should have obtained a mole per that same unit time of a pure aluminum chloride. However, such was not the case. In fact, the results were a wide range of very low yield which has no correlation to what theoretically should have been occurring. As an example, under the laboratory conditions, pure aluminum chloride was mixed with pure iron chloride, and through sublimation at approximately 180° C. and at one atmosphere of pressure, the yield, although theoretically being equal to the amount that would be starting in the experiment, did not produce the expected yield, yet the product was pure.

That being the case, it was decided that there was an unknown factor which did not allow us to obtain full yield of pure aluminum chloride during the sublimation. At one point in the experiments, upon the sublimation of crude aluminum chloride, which had been obtained through carbo-chlorination, and had traces of sulfur or sulfur compound, not only pure product was obtained, but the expected or calculated yield was achieved also. Therefore, through these experiments, it was determined that the elemental sulfur or an equivalent sulfur compound was serving not as a reactant involved in the formation of sulfur aluminum compounds, but as a catalyst in obtaining our yield. Therefore, the process of the present invention was undertaken, and the purity and high yield were achieved which will be the subject of the claimed invention process.

2. Summary of the Invention

The overall process of the preferred embodiment of the present invention would solve the problems being confronted in the present state of the art in a straightforward manner. The present invention relates to the purification of aluminum chloride, with the crude aluminum chloride normally being obtained through a process of carbo-chlorination of metallic ores, in particularly aluminum bearing ores, to make the metallic chlorides, in particular aluminum chloride. In the present invention, if the crude aluminum chloride does not contain traces of sulfur, the crude aluminum chloride is blended with elemental sulfur or an equivalent sulfur containing compound and simultaneously elemental aluminum powder or an equivalent aluminum containing compound in the solid state is added to the crude aluminum chloride. This blend is kept at 180° C. at one atmosphere of pressure and is fed into a screw-type sublimer wherein the substantially pure aluminum chloride undergoes sublimation in the presence of elemental nitrogen as a purging agent and under constant agitation. The sublimed aluminum chloride is streamed into a reaction ground bed containing aluminum granules at approximately 250° C. for removal of the traces of elemental sulfur therefrom. The then pure aluminum chloride, in the vapor state, is condensed for subsequent collection. If necessary, the aluminum chloride may be further purified through a rectification column and subsequent collection thereafter.

Therefore, it is one of the primary objects of the present invention to provide a process for the purification of metallic chlorides, particularly aluminum chloride, utilizing sulfur and/or functionally equivalent sulfur containing compounds as a reaction promoter.

It is another principal object of the present invention to provide a process for the purification of metal chlorides, particularly aluminum chloride, at a greater purity utilizing the addition of powdered aluminum metal and/or functionally equivalent aluminum containing compounds.

It is yet another principal object of the present invention to produce pure aluminum chloride through the process of agitated sublimation at approximately 180° C.

It is yet another principal object of the present invention to provide granular aluminum reaction to react with the sulfur containing aluminum chloride following the sublimation to remove the elemental sulfur impurities.

It is yet a further object of the present invention to provide a further step of condensation of the pure aluminum chloride following the reaction and prior to collection.

Among the many advantages and features of the present invention, it is a provision for the first time in the purification of crude aluminum chloride through the (A) injection of powdered aluminum coupled with the (B) injection of sulfur and/or functionally equivalent sulfur compounds and (C) the subsequent sublimation of the pure aluminum chloride which is under agitation for the yielding of commercially pure aluminum chloride.

The above objects, together with other distinguishing features and advantages of the present invention will be apparent to one skilled in the art in light of the insuing detailed disclosure of its preferred embodiment which are also distinctively claimed hereinafter.

BRIEF DESCRIPTION OF THE DRAWINGS

For a further understanding of the nature and objects of the present invention, reference should be taken to the following detailed description, in conjunction with the accompanying drawings, in which like parts are given like reference numerals and, wherein.

DETAILED DESCRIPTION OF THE PREFERRED EMBODIMENT

Figure 1:
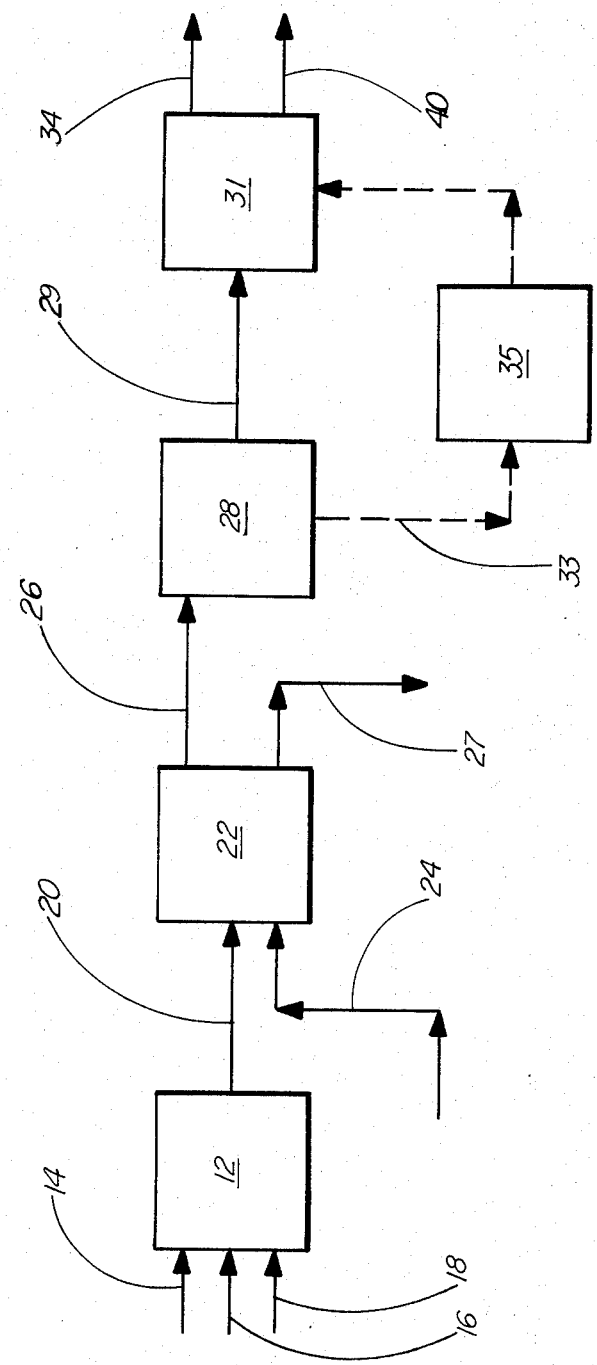
FIG. 1 illustrates a schematic flow diagram of the aluminum chloride purification process in the preferred embodiment of the present invention.

In FIG. 1, there is illustrated in the preferred embodiment the process of the present invention, a blending tank 12 which is a tank relatively well known in the art for blending various materials that are injected thereinto. In the particular process there is injected a principal stream 14 of aluminum chloride which is in the crude state, i.e., 95% aluminum chloride with approximately 5% of other metallic chloride impurities. Also injected into the blender 12 is a stream of preferably elemental sulfur and/or functionally equivalent sulfur containing compounds. It should be noted that if the crude aluminum chloride being injected contains a sufficient quantity of sulfur to effect the yield, then sulfur need not be added.

As further seen in FIG. 1, there is also injected simultaneously together with the sulfur stream and the crude aluminum chloride stream, a stream of preferably powdered aluminum metal and/or functionally equivalent aluminum containing compound, via stream 18. As seen in the FIGURE, the injection of streams 14, 16 and 18 into blender 12 enables the yield of aluminum chloride to be significantly higher, for further steps of the process. The mechanism by which sulfur acts as a reaction promoter and to increase the rate of yield of pure chloride as not yet been fully established. However, while not wishing to be bound by theory, it is believed that the active reaction promotor or catalyst is elemental sulfur. The term "reaction promoter" comprises one of the apparent functions of the sulfur and/or functionally equivalent sulfur compounds as a catalytic agent relative to improvement in reaction rates achieved in the present invention and also commonly results in a higher yield values. However, the use of sulfur as a reaction promoter in the purification step of purification of aluminum chloride is a novel use of sulfur, and is thus one of the prime basis of this particular inventive process.

Following the blending of aluminum chloride sulfur and aluminum powder in blender 12, the stream is then moved via line 20 into preferably a laterally disposed screw-type sublimer 22. This type of screw-type sublimer 22 is relatively well known in the art, and therefore, its functioning components shall not be detailed. It is necessary in the particular process, that the container portion of sublimer 22 maintained at a temperature of not less that 180° C. and at an atmospheric pressure not under 1 atmosphere and the blend be under constant agitation. Under these conditions, aluminum chloride, which has been acted upon by the sulfur and aluminum powder, sublimes in a substantially pure form in sublimer 22 and is in the state for collection. However, as seen in the FIGURE, sublimer 22 has injected into it a stream of nitrogen gas 24 which serves to purge the contents of the sublimer and provides further for a purer stream of aluminum chloride in the sublimed state moving out line 26, as seen in the FIGURE, and the byproducts collected at point 27. Following the movement of the sublimed aluminum chloride, now in the vapor state, out of sublimer 22 into line 26, it is known that the pure aluminum chloride shall have traces of elemental sulfur contained therein, which must be removed prior to the condensation of the aluminum chloride product. That being the case, the stream of aluminum chloride in line 26 is fed into a granular reactor 28 which comprises solid aluminum granules or activated granular aluminum metal which is sufficient to remove the sulfur impurities and other metal chloride traces contained in the pure aluminum chloride. The aluminum chloride stream moves up through granular reactor 28 into line 29, wherein it is then collected in a "cold zone" at approximately 25° C. wherein the stream of aluminum chloride is then condensed in condensor 31 and collected as substantially pure, i.e., less than 0.05% metal chloride or pure aluminum chloride at point 34, with the nitrogen gas being collected from point 40.

In order to inhance the movement of the sublimed aluminum chloride out of sublimer 22 through granulated filter 28, the stream would tend to move from the hot zones of the sublimer and reactor 28 into the cold zone of condensor 31 at 25° C., therefore assuring the constant swift movement of the sublimed stream of pure aluminum chloride through the system.

In an alternate embodiment, as seen by phantom lines 33, should following the reacting of a stream through reactor 28, a stream of aluminum chloride not be sufficiently pure, the stream could then be routed through a rectification column 35 and condense into the condensor 31 for condensation thereinto.

As is stated earlier, the significant aspects of the present process is the fact that elemental sulfur and/or functionally equivalent sulfur containing compounds, are being added to a stream of crude aluminum chloride for a process enhancer or yield enhancer in the purification of crude aluminum chloride, i.e., other than as a major reducing agent or reactant. It is well recognized in the art, that it is very desirable in certain instances to add sulfur and/or functionally equivalent sulfur containing compounds to the carbo chlorination phase in the production of crude aluminum chloride in order to achieve considerably higher rates and yields, in fact, the best results are achieved under certain conditions by adding the sulfur to both pre-chlorination and carbo chlorination steps.

However, upon the addition of one or more sulfur compounds selected from the chemical classes defined herein, the rate of reaction increases significantly and much improved yields are observed. However, the carbo chlorination reaction phase of the carbo chlorination process is conducted within a temperasture range of from about 400° C. to about 1,000° C. with the low temperature range from about 600° C. to about 800° C., for best results. However, although this particular use of sulfur in this process is known in the art, the fact that the increased temperatures in order to get an effective yield, would not defective in the purification of aluminum chloride, and is therefore, as taught in the present state of the art, non applicable. It is novel to maintain the purification temperature on or about 180° C., i.e., the subliming temperature of aluminum chloride, and together with the injection of elemental sulfur thereinto, the reaction rate and yield of pure aluminum chloride is increased dramatically. This use of elemental sulfur in this particular stage in the purification of aluminum chloride is a significant breakthrough in the overall process, and will be of significant value in providing the aluminum industry with pure aluminum chloride at a relatively low cost in the process.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not limiting in any sense.

What is claimed as invention is:

1. A process for purifying aluminum chloride comprising the steps of:
    a. providing solid crude aluminum chloride containing at least one sulfur containing member selected from the group consisting of elemental sulfur and/or functionally equivalent sulfur containing compounds;
    b. adding at least one solid aluminum containing member selected from the group consisting of elemental aluminum and/or functionally equivalent aluminum containing compounds to said crude aluminum chloride to form a blend;
    c. heating the blend of solid crude aluminum chloride containing sulfur and the aluminum metal to at least 180° C. under at least one atmosphere of pressure; and
    d. subliming substantially pure aluminum chloride from the solid blend, the at least one sulfur containing member contained in the solid blend being present in an amount to increase the yield and rate of formation of pure aluminum chloride.

2. The method in claim 1, wherein the solid blend is agitated during the sublimation step.

3. The method of claim 1, in which the at least one sulfur containing member in said solid crude aluminum chloride is elemental sulfur.

4. The method of claim 1, in which the at least one aluminum containing member added to the crude aluminum chloride is powdered aluminum metal.

5. The method of claim 1, further comprising the step of reacting the sublimed aluminum chloride for removing sulfur impurities at a temperature range between 230° and 250° C.

6. The method of claim 1, further comprising the step of condensing the sublimed aluminum chloride following the reaction step.

7. The method of claim 4, wherein the reacting medium of the sublimed aluminum chloride comprises an apparatus containing granulated aluminum.

8. The method of claim 5, wherein the step of condensing the sublimed aluminum chloride would take place at a temperature less than 180° C.

9. A process for purifying aluminum chloride comprising the steps of:
   a. providing solid crude aluminum chloride;
   b. adding at least one solid sulfur containing member selected from the group consisting of elemental sulfur and/or functionally equivalent sulfur containing compounds to the crude aluminum chloride;
   c. adding solid aluminum metal to the solid crude aluminum chloride and sulfur containing member;
   d. heating and blending the solid crude aluminum chloride, solid aluminum metal and solid sulfur containing member to a temperature of approximately 180° C. at one atmosphere of pressure;
   e. subliming pure aluminum chloride from the solid blend; and
   f. condensing the pure aluminum chloride stream, the at least one sulfur containing member contained in the blend being present in an amount to increase the yield and rate of formation of pure aluminum chloride.

10. The method of claim 9, wherein the blend is agitated during the sublimation step.

11. The process of claim 9, in which the at least one sulfur containing member added to crude aluminum chloride is elemental sulfur.

12. The method of claim 9, in which the at least one aluminum metal containing member added to the crude aluminum chloride is powdered aluminum metal.

13. The method of claim 9, further comprising the step of conducting or leading the pure aluminum chloride following sublimation but prior to condensation, through a granulated aluminum reactor medium at a temperature range of 230°–250° C.

14. The method of claim 9, wherein the step of condensing the sublimed aluminum chloride takes place at a temperature less than 180° C.

15. A process for purifying aluminum chloride comprising the steps of:
   a. providing solid crude aluminum chloride;
   b. adding solid elemental sulfur to the crude aluminum chloride;
   c. adding powdered aluminum metal to the solid crude aluminum chloride and solid elemental sulfur to form a blend;
   d. heating and agitating the blend of solid crude aluminum chloride, powdered aluminum metal, and solid elemental sulfur to a temperature of approximately 180° C. at one atmosphere of pressure;
   e. subliming substantially pure aluminum chloride from the blend;
   f. conducting the pure aluminum chloride through a granulated aluminum reactor medium at a temperature range of 230° to 250° C.; and
   g. condensing the sublimed pure aluminum chloride at a temperature less than 180° C.

16. The method of claim 15, in which the mixture of crude aluminum chloride, the sulfur containing member and the aluminum containing member is heated to a temperature of at least 180° C.

17. The process of claim 15, wherein the elemental sulfur is present in the blend to increase the yield and rate of formation of substantially pure aluminum chloride.

* * * * *